United States Patent
Kaefer et al.

(10) Patent No.: US 8,407,992 B2
(45) Date of Patent: Apr. 2, 2013

(54) AMMONIA TANK OF AN EXHAUST GAS TREATMENT SYSTEM OF A VEHICLE

(75) Inventors: Sebastian Kaefer, Stuttgart (DE); Vera Lindemer, Ditzingen (DE); Markus Buerglin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 12/736,634

(22) PCT Filed: Feb. 4, 2009

(86) PCT No.: PCT/EP2009/051249
§ 371 (c)(1),
(2), (4) Date: Oct. 25, 2010

(87) PCT Pub. No.: WO2009/130066
PCT Pub. Date: Oct. 29, 2009

(65) Prior Publication Data
US 2011/0173960 A1 Jul. 21, 2011

(30) Foreign Application Priority Data
Apr. 23, 2008 (DE) .......................... 10 2008 001 340

(51) Int. Cl.
| F01N 3/00 | (2006.01) |
| F01N 3/10 | (2006.01) |
| B65D 1/24 | (2006.01) |
| B65D 1/36 | (2006.01) |
| B65D 25/04 | (2006.01) |
| B65D 57/00 | (2006.01) |
| B65D 85/00 | (2006.01) |
| B65D 88/12 | (2006.01) |
| B60P 3/00 | (2006.01) |
| B62D 33/00 | (2006.01) |

(52) U.S. Cl. ............ 60/303; 60/295; 220/506; 220/562; 220/564

(58) Field of Classification Search .................... 60/286, 60/295, 301, 303; 220/4.12, 23.87, 23.89, 220/506, 562, 564
See application file for complete search history.

(56) References Cited

U.S. PATENT DOCUMENTS
| 3,709,712 A * | 1/1973 | Rossman ...................... 427/142 |
| 5,979,227 A | 11/1999 | Lawson et al. |
| 2005/0026298 A1 | 2/2005 | Bickett et al. |
| 2007/0010027 A1 | 1/2007 | Bickett et al. |

FOREIGN PATENT DOCUMENTS
| JP | 61031937 A | 2/1986 |
| JP | 2006090971 A | 4/2006 |
| WO | 9616321 A1 | 5/1996 |

* cited by examiner

Primary Examiner — Kenneth Bomberg
Assistant Examiner — Audrey K Bradley
(74) Attorney, Agent, or Firm — Michael Best & Friedrich LLP

(57) ABSTRACT

The invention relates to an ammonia tank of an exhaust gas treatment system of a vehicle, having a tank wall. The invention provides that the tank wall is surrounded by a reagent reacting with regard to ammonia.

19 Claims, 1 Drawing Sheet

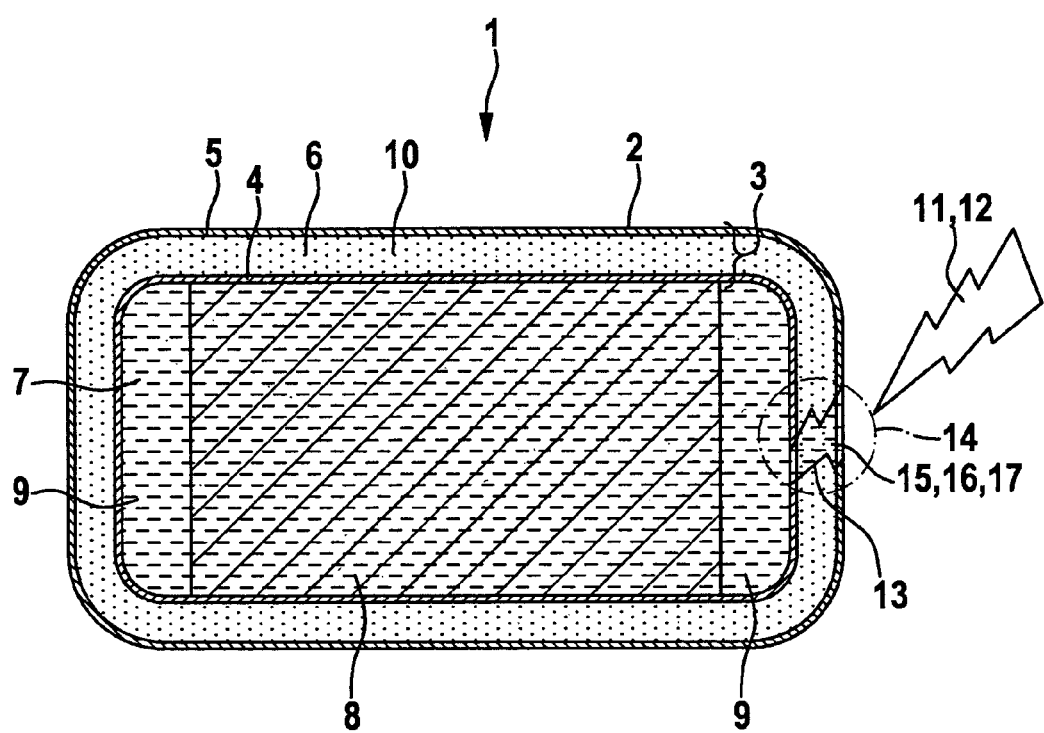

AMMONIA TANK OF AN EXHAUST GAS TREATMENT SYSTEM OF A VEHICLE

CROSS-REFERENCE TO RELATED APPLICATION

This application is a 35 USC 371 application of PCT/EP2009/051249 filed on Feb. 4, 2009.

BACKGROUND OF THE INVENTION

1. Field of the Invention

The invention relates to an ammonia tank of an exhaust gas treatment system of a vehicle.

2. Description of the Prior Art

Vehicles with exhaust gas treatment systems, in particular those with DeNOx catalytic converters or selective catalytic converters, must in certain technical embodiments carry ammonia or an ammonia-releasing substance along with them, since ammonia, in particular as a solution of urea and water, is used as a reaction material in the exhaust gas treatment system. Ammonia is a gas that in some concentrations is irritating, and its release is unwanted. External effects, for instance from an accident or some other unintended mechanical effect, can lead to an uncontrolled escape of ammonia into the environment. The rapid emergence of a very large quantity of ammonia can lead to direct poisoning with an irritant and etching effect. A slow, gradual emergence from smaller leaks, or in very unfavorable cases from corrosion, leads to a steady drop in the supply, and in unmonitored closed spaces, an unnoticed increase in the ammonia concentration can occur, and as a result a toxic or even explosive concentration can develop without being noticed. Because of the low odor threshold value, upon penetration into the passenger compartment, a panic reaction, even at concentrations that are not dangerous, cannot be entirely precluded.

OBJECT AND SUMMARY OF THE INVENTION

It is the object of the invention, even in unfavorable cases, to maximally avoid the release of ammonia from the ammonia tank, for which purpose a suitable ammonia tank is to be made available.

To that end, an ammonia tank in an exhaust gas treatment system of a vehicle is proposed, having a tank wall. It is provided that the tank wall is sheathed by a reagent that reacts with respect to ammonia. The reagent is a solid material or for example a paste by which the tank wall is sheathed on the outside. If ammonia then emerges, for instance from damage to the tank wall, it comes into contact with the reagent and reacts with it. As a result, the release of ammonia in an unwanted quantity can be prevented. In particular, the embodiment of the reagent as a pasty substance, which is applied for instance to the outside of the tank wall, means that because of the flow properties of pastes, that sufficient reagent is always available at the exit point, and the reaction can take place with the emerging ammonia.

In another embodiment, it is provided that the ammonia tank is a pressure vessel which has or contains an ammonia-releasing substance, in particular an adsorber, a complexing agent, or an ammonia salt. In the pressure vessel, the ammonia is released from the releasing substance and accordingly is essentially in bound form there. The release is done as needed and is brought about by way of the regulating a control devices known from the prior art.

In another embodiment, the tank wall is embodied at least as a double wall and has at least one hollow chamber which surrounds the entire tank volume and in which a reagent that reacts with respect to ammonia is located. The nucleus of the invention is that the reagent placed in the hollow chamber reacts with the ammonia as soon as the tank wall is damaged, and in particular if the inner wall of the double wall is damaged, so that the reagent and ammonia can react with one another.

In an embodiment, it is provided that the reagent reacts with ammonia to form a reaction product which has an optical display function, in particular a warning function. In this respect it is conceivable for instance for the reaction product to be colored, in particular brightly colored, so that leaks are immediately and very easily recognizable, especially whenever the reaction product is adherent, so that traces of the motion can be traced to the source. In particular, it is thus possible for any leak to be found and identified immediately as such.

In another embodiment, it is provided that the reagent reacts with ammonia to form a reaction product which acts as a tank leak sealing product. A tank leak sealing product here is one that is capable of sealing off any possible leak in the double wall, and thus particularly in the course of a large-area process, it closes the leak and/or at least penetrates it in some, portions in such a way that the passage of ammonia through it is no longer possible.

In a further embodiment, it is provided that the reagent reacts with ammonia to form a neutralization product that is not harmful to the human being. The neutralization product is accordingly one that is not objectionable to the human being from the standpoint of health. The unwanted properties of ammonia for the human being, in particular its etching and/or irritant property, are neutralized. Very particularly preferably, the neutralization product is also not harmful to materials, so that an unwanted change, in particular a chemical change, in construction materials of the motor vehicle from the emergence of the ammonia no longer takes place after neutralization to the neutralization product.

Preferably, the reagent (10) is selected from the group of salts of one or more alkaline earth elements, such as $MgCl_2$, $CaCl_2$.

A further preferred embodiment of the reagent is a salt of one or more third subgroup elements, such as manganese, iron, cobalt, nickel, copper, and/or zinc.

In another preferred embodiment, the reagent is an organic adsorber or ammonium salt, such as ammonium carbonate.

The reagent can also be an acid or an acidically reacting salt, such as a Lewis or Brönsted acid compound.

Especially preferably, the reagent is selected from the group of substances which form complexes in the presence of ammonia. Such complexing agents are capable of compacting solid materials and in particular of sealing off leaks. At the same time, as a rule, entirely harmless compounds are produced.

In one embodiment, the reagent is in the form of a monolithic or porous solid body. Consequently, in the form of a solid body of the type designated, it is placed in the hollow chamber formed by the double wall.

In another embodiment, the reagent is in the form of a bed of granular or powdered material. Such beds are simpler and less expensive to place in the hollow chamber, for instance through an opening provided for that purpose, which after the filling is done can be closed again.

In a further embodiment, the reagent is in the form of a pasty or gel-like substance.

In a further embodiment, the reagent is a foaming agent.

In still another embodiment, the reagent is a gas, in particular a gas which itself creeps to only a slight extent. This assures that in the event of damage to the ammonia tank from outside, it will not volatilize before it can adequately react with the emerging ammonia.

Preferably, a quantity of reagent such that, upon complete filling of the ammonia tank, it suffices to bind maximum emerging ammonia is placed in the hollow chamber. Accordingly, the dimensioning of the reagent in the hollow chamber is preferably done such that the reagent is present in such a quantity that in accordance with the stoichiometric equation the sequence of the reaction, at least an equilibrium of the substances, that is, the reagent and ammonia, is present, but preferably there is a marked excess of reagent, such that even when the ammonia tank is completely full, the maximum quantity of emerging ammonia can reliably be bound by the reaction.

In a further embodiment, the reagent has a heat-insulating effect. In this way, heat insulation of the tank content occurs, reinforcing the safety function of the reagent.

BRIEF DESCRIPTION OF THE DRAWINGS

The invention will be described below in further detail below in conjunction with the drawing, in which:

FIG. 1 shows an ammonia tank, with a hollow chamber which receives reagent and is formed by a double wall.

DESCRIPTION OF THE PREFERRED EMBODIMENT

The drawing shows an ammonia tank 1 of an exhaust gas treatment system, not shown, of a vehicle, not shown. The ammonia tank 1 has a tank wall 2, which is embodied as a double wall 3; this double wall is formed of an inner tank sheath 4 and an outer tank sheath 5, and a hollow chamber 6 is embodied between the inner tank sheath 4 and the outer tank sheath 5. The tank wall 2 encloses a tank interior 7, in which an ammonia-storing substrate 8 is located, from which ammonia 9 is released, ammonia which is taken from the ammonia tank via removal devices, not shown, and can be supplied to the exhaust gas treatment system, not shown. In the hollow chamber 6, which is located between the inner tank sheath 4 and the outer tank sheath 5 and which entirely surrounds the tank interior 7, a reagent 10 is placed which reacts with the ammonia 9 to form a reaction product 16. As long as the tank wall 2, and in particular the inner tank sheath 4, is undamaged, no reaction whatever takes place between the ammonia 9 and the reagent 10. However, if as a result of a damaging event 11, in particular an external effect 12, of the kind that can occur for instance in an accident, the tank, wall 2 is damaged and in particular pierced, creating a damaged place 13, the hermetic separation of ammonia 9 and reagent 10, which is due to the inner tank sheath 4, is undone at this point, so that in the region of the damaged place 13, a reaction 14 takes place between the ammonia 9 and the reagent 10. Preferably, what is formed here is a neutralization product 15 that is not harmful to the human being, which neutralizes etching and irritant properties of ammonia. Especially preferably, the reaction product 16 formed in the reaction 14 is a tank leak sealing product 17, that is, a product of the kind that in a wide-ranging process is formed of ammonia 9 and reagent 10 and is capable here of at least predominantly, but especially preferably completely, closing the damaged place 13. Inside the hollow chamber 6, the reagent 10 is present in such a quantity that the maximum ammonia gas 9 emerging, when the tank interior 7 is completely filled with ammonia 9, can be entirely bound, when at least a stoichiometric ratio is made the basis here.

The foregoing relates to the preferred exemplary embodiments of the invention, it being understood that other variants and embodiments thereof are possible within the spirit and scope of the invention, the latter being defined by the appended claims.

The invention claimed is:

1. An ammonia tank of an exhaust gas treatment system of a vehicle, having a tank wall which is sheathed by a reagent that reacts with respect to ammonia, and the reagent reacts with ammonia to form a reaction product which acts as a tank leak sealing product, wherein the tank wall is embodied at least as a double wall and has at least one hollow chamber which surrounds an entire tank volume and in which the reagent is located.

2. The ammonia tank as defined by claim 1, wherein the ammonia tank is a pressure vessel which has or contains an ammonia-releasing substance, the substance being an adsorber, a complexing agent, or an ammonia salt.

3. The ammonia tank as defined by claim 1, wherein the reagent reacts with ammonia to form a reaction product which has an optical warning function.

4. The ammonia tank as defined by claim 1, wherein the reagent reacts with ammonia to form a neutralization product that is not harmful to a human being.

5. The ammonia tank as defined by claim 1, wherein the reagent is selected from a group of salts of one or more alkaline earth elements.

6. The ammonia tank as defined by claim 1, wherein the reagent is a salt selected from one or more third subgroup elements.

7. The ammonia tank as defined by claim 1, wherein the reagent is an organic adsorber or ammonium salt.

8. The ammonia tank as defined by claim 1, wherein the reagent is an acid, an acidically reacting salt, or a Lewis or Brönsted acid compound.

9. The ammonia tank as defined by claim 1, wherein the reagent is selected from a group of substances which form complexes in a presence of ammonia.

10. The ammonia tank as defined by claim 1, wherein the reagent is in a form of a monolithic or porous solid body.

11. The ammonia tank as defined by claim 1, wherein the reagent is in a form of a bed of granular or powdered material.

12. The ammonia tank as defined by claim 1, wherein the reagent is in a form of a pasty or gel-like substance.

13. The ammonia tank as defined by claim 1, wherein the reagent is a foaming agent.

14. The ammonia tank as defined by claim 1, wherein the reagent is a gas.

15. The ammonia tank as defined by claim 1, wherein a quantity of reagent is placed in the hollow chamber such that, upon complete filling of the ammonia tank, it suffices to bind maximum emerging ammonia.

16. The ammonia tank as defined by claim 1, wherein the reagent has a heat-insulating effect.

17. The ammonia tank as defined by claim 1, wherein the reagent is selected from $MgCl_2$ or $CaCl_2$.

18. The ammonia tank as defined by claim 1, wherein the reagent is a salt selected from manganese, iron, cobalt, nickel, copper, and/or zinc.

19. The ammonia tank as defined by claim 1, wherein the reagent is ammonium carbonate.

* * * * *